United States Patent
Seo et al.

(10) Patent No.: US 9,877,314 B2
(45) Date of Patent: Jan. 23, 2018

(54) METHOD AND APPARATUS FOR RECEIVING CONTROL INFORMATION OVER AN ENHANCED PHYSICAL DOWNLINK CONTROL CHANNEL (PDCCH) IN WIRELESS COMMUNICATION SYSTEM

(71) Applicant: LG ELECTRONICS INC., Seoul (KR)

(72) Inventors: Inkwon Seo, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 205 days.

(21) Appl. No.: 14/770,725

(22) PCT Filed: Feb. 27, 2014

(86) PCT No.: PCT/KR2014/001641
§ 371 (c)(1),
(2) Date: Aug. 26, 2015

(87) PCT Pub. No.: WO2014/133341
PCT Pub. Date: Sep. 4, 2014

(65) Prior Publication Data
US 2016/0014728 A1    Jan. 14, 2016

Related U.S. Application Data

(60) Provisional application No. 61/770,283, filed on Feb. 27, 2013, provisional application No. 61/774,599, filed on Mar. 8, 2013.

(51) Int. Cl.
H04W 72/04    (2009.01)
H04W 72/12    (2009.01)
(Continued)

(52) U.S. Cl.
CPC ......... *H04W 72/042* (2013.01); *H04L 5/0053* (2013.01); *H04W 72/00* (2013.01);
(Continued)

(58) Field of Classification Search
CPC ... H04W 24/00; H04W 72/04; H04W 24/042; H04W 72/12; H04W 88/02; H04W 8/26; H04L 27/26; H04L 5/0053; H04L 5/0051
See application file for complete search history.

(56) References Cited

U.S. PATENT DOCUMENTS

2013/0064196 A1*   3/2013   Gao ............... H04L 5/0016
                                                  370/329
2014/0341180 A1*  11/2014   Liu ............... H04L 5/0051
                                                  370/330

OTHER PUBLICATIONS

Huawei et al., "EPDCCH Transmission on NCT," 3GPPTSG RAN WG1 Meeting #72, R1-130442, St. Julian's, Malta, Jan. 28-Feb. 1, 2013, pp. 1-2.*

(Continued)

*Primary Examiner* — Afshawn Towfighi
*Assistant Examiner* — Mewale Ambaye
(74) *Attorney, Agent, or Firm* — Birch, Stewart, Kolasch & Birch, LLP

(57) ABSTRACT

An embodiment of the present invention relates to a method for receiving a control signal through an enhanced physical downlink control channel (EPDCCH) by a user equipment in a wireless communication system, the method comprising: receiving a demodulation reference signal (DMRS) included in a physical resource block (PRB) pair; and monitoring an EPDCCH associated with the DMRS, wherein a minimum aggregation level or the number of enhanced resource element groups (EREGs) per enhanced control channel element (ECCE) applied to the EPDCCH is determined depending on to which interval of a plurality of predetermined intervals the number of resource elements (REs) included in the PRB pair belongs.

12 Claims, 12 Drawing Sheets

(51) Int. Cl.
*H04W 72/00* (2009.01)
*H04L 5/00* (2006.01)

(52) U.S. Cl.
CPC ............ *H04W 72/04* (2013.01); *H04W 72/12* (2013.01); *H04L 5/0051* (2013.01)

(56) References Cited

OTHER PUBLICATIONS

Ericsson et al., "ePDCCH Blind Decoding," 3GPP TSG-RAN WG1 #71, R1-125234, New Orleans, USA, Nov. 12-16, 2012, pp. 1-5.*
Sharp, "Details of Association Between DM-RS Ports and EPDCCH," 3GPP TSG RAN WG1 Meeting #70bis, R1-125143, New Orleans, USA, Nov. 12-16, 2012, pp. 1-8.*
Huawei et al., "Number of Blind Decoding Assignment," 3GPP TSG FtAN WG1 Meeting #71, R1-125152, New Orleans, USA, Nov. 12-16, 2012, pp. 1-9.*
Huawei et al., "EPDCCH Transmission on NCT," 3GPP TSG RAN WG1 Meeting #72, R1-130442, St. Julian's, Malta, Jan. 28-Feb. 1, 2013, pp. 1-2.
Huawei et al, "Number of Blind Decoding Assignment," 3GPP TSG RAN WG1 Meeting #71, R1-125152, New Orleans, USA, Nov. 12-16, 2012, pp. 1-9.
LG Electronics, "Handling the Conflict of PSS/SSS and DM-RS in NCT," 3GPP TSG RAN WG1#72, R1-130250, St Julian's, Malta, Jan. 28-Feb. 1, 2013, pp. 1-6.

* cited by examiner

FIG. 5
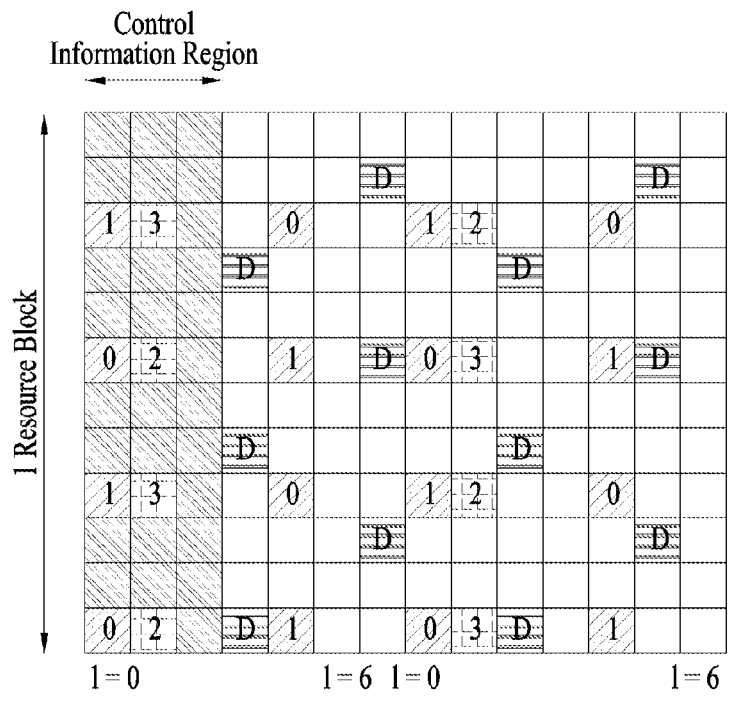
(a)
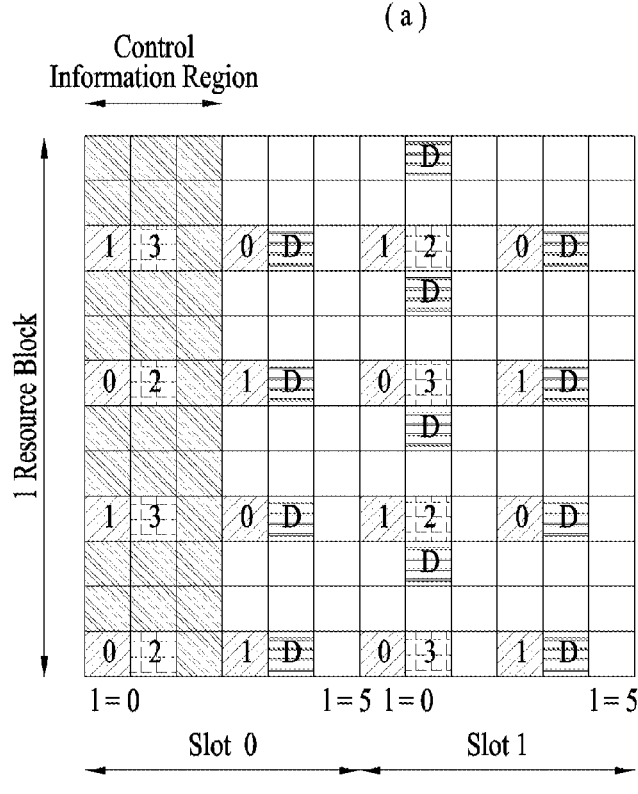
(b)

FIG. 6
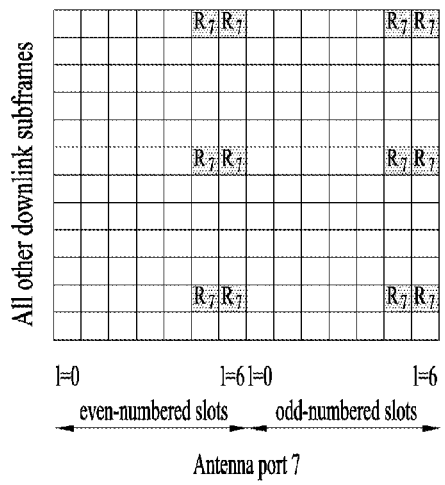
Antenna port 7
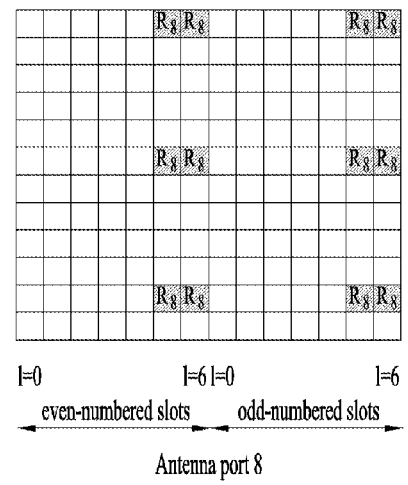
Antenna port 8
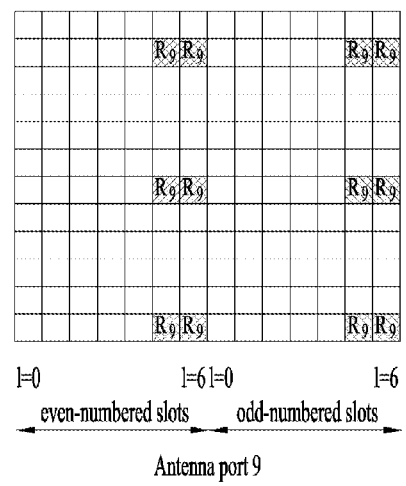
Antenna port 9
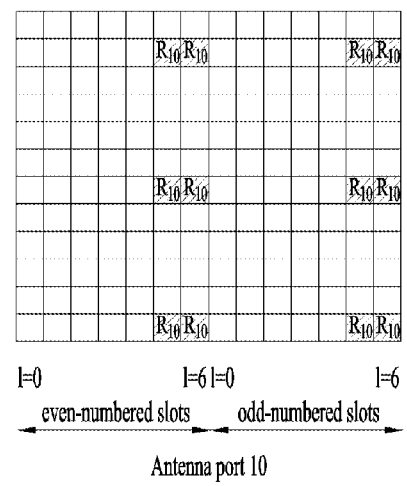
Antenna port 10

FIG. 8

METHOD AND APPARATUS FOR RECEIVING CONTROL INFORMATION OVER AN ENHANCED PHYSICAL DOWNLINK CONTROL CHANNEL (PDCCH) IN WIRELESS COMMUNICATION SYSTEM

CROSS REFERENCE TO RELATED APPLICATIONS

This application is the National Phase of PCT International Application No. PCT/KR2014/001641, filed on Feb. 27, 2014, which claims priority under 35 U.S.C. 119(e) to U.S. Provisional Application Nos. 61/770,283, filed on Feb. 27, 2013 and 61/774,599, filed on Mar. 8, 2013, all of which are hereby expressly incorporated by reference into the present application.

TECHNICAL FIELD

This disclosure relates to a wireless communication system, and more particularly, to a method and apparatus for receiving control information over an enhanced physical downlink control channel (EPDCCH).

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

DISCLOSURE

Technical Problem

An object of the present invention is to provide a method for receiving control information over an EPDCCH even if the number of available resource elements is small.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

The object of the present disclosure can be achieved by providing a method for receiving control information over an enhanced physical downlink control channel (EPDCCH) by a terminal in a wireless communication system, the method including receiving a demodulation reference signal (DMRS) included in a physical resource block (PRB) pair and monitoring an EPDCCH associated with the DMRS, wherein a lowest aggregation level or the number of enhanced resource element groups (EREGs) per enhanced control element (ECCE) applied to the EPDCCH is determined depending on a range covering the number of resource elements (REs) included in the PRB pair among a plurality of preset ranges.

According to another aspect of the present disclosure, provided herein is a terminal for receiving a downlink signal over an enhanced physical downlink control channel (EPDCCH) in a wireless communication system, the terminal including a reception module and a processor, wherein the processor is configured to receive a demodulation reference signal (DMRS) included in a physical resource block (PRB) pair and monitor an EPDCCH associated with the DMRS, wherein a lowest aggregation level or the number of enhanced resource element groups (EREGs) per enhanced control element (ECCE) applied to the EPDCCH is determined depending on a range covering the number of resource elements (REs) included in the PRB pair among a plurality of preset ranges.

The lowest aggregation level applied to the EPDCCH may be inversely proportional to the number of REs included in the PRB pair.

The number of EREGs per ECCE may be constant regardless of the range.

The number of EREGs per ECCE may be inversely proportional to the number of REs included in the PRB pair.

The lowest aggregation level applied to the EPDCCH may be constant regardless of the range.

The range may be distinguished by an integer multiple of the number of REs according to a lowest coding rate for transmitting one downlink control information item.

REs mapped to the DMRS may be equally spaced in a frequency domain.

The DMRS may be shifted along a frequency axis according to a cell ID.

The REs mapped to the DMRS may be present on first and second OFDM symbols.

If the number of the available REs is less than or equal to a preset value, all DMRSs included in another PRB pair bundled with the PRB pair may be used in performing the monitoring.

EREG indexing may be applied to only 144 REs in the PRB pair regardless of DMRS overhead.

The EREG indexing may be performed except for REs used for the DMRS.

Advantageous Effects

According to an embodiment of the present invention, channel estimation may be efficiently performed even if the number of available resource elements is small. In addition, control information may be transmitted/received over an EPDCCH.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 illustrates a reference signal;

FIG. 6 illustrates a demodulation reference signal (DMRS);

FIG. 8 illustrates EREG-to-ECCE mapping;

BEST MODE

Figure 1:
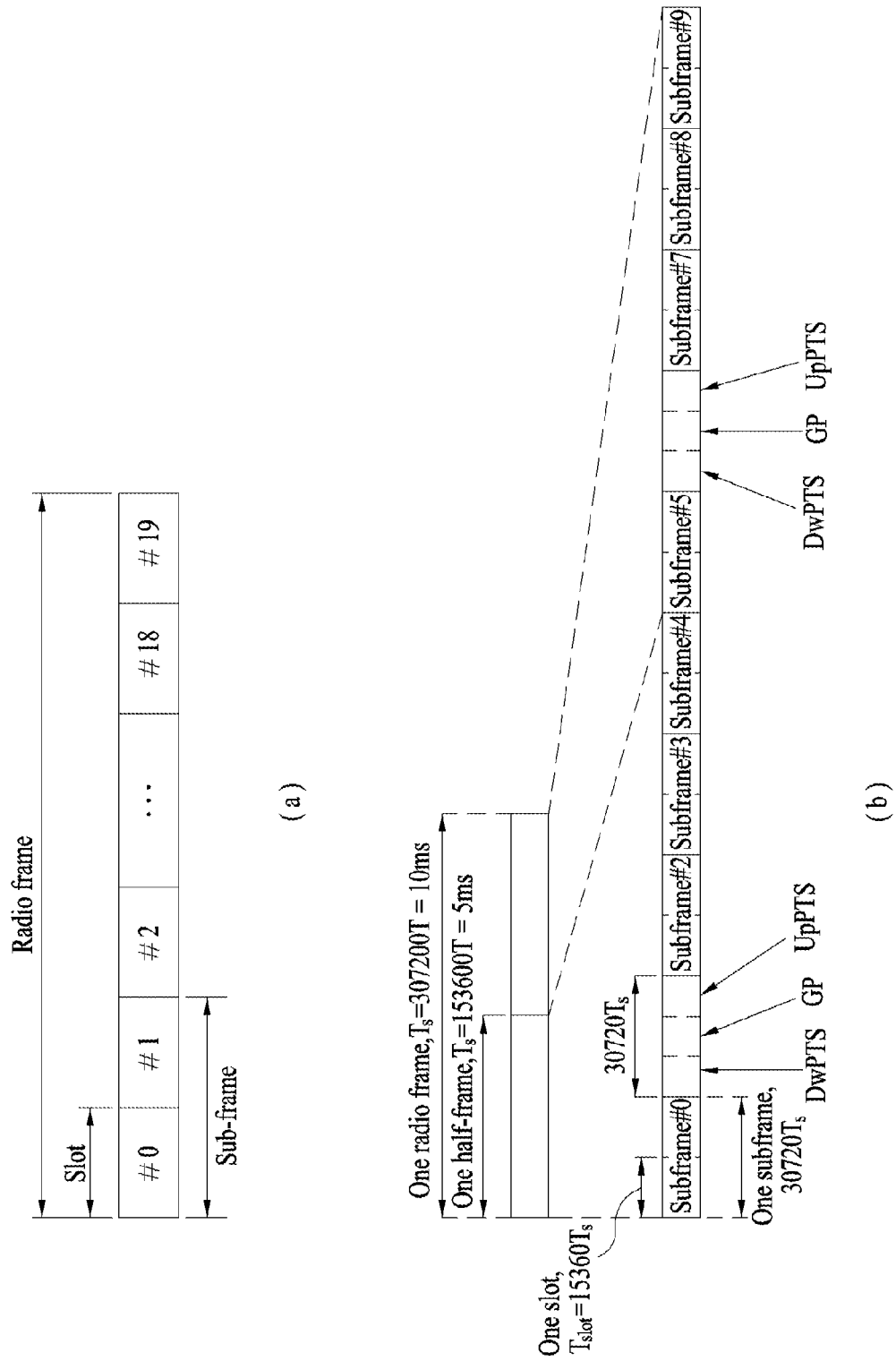
FIG. 1 illustrates a radio frame structure.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Hereinafter, the structure of a radio frame will be described with reference to FIG. 1.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
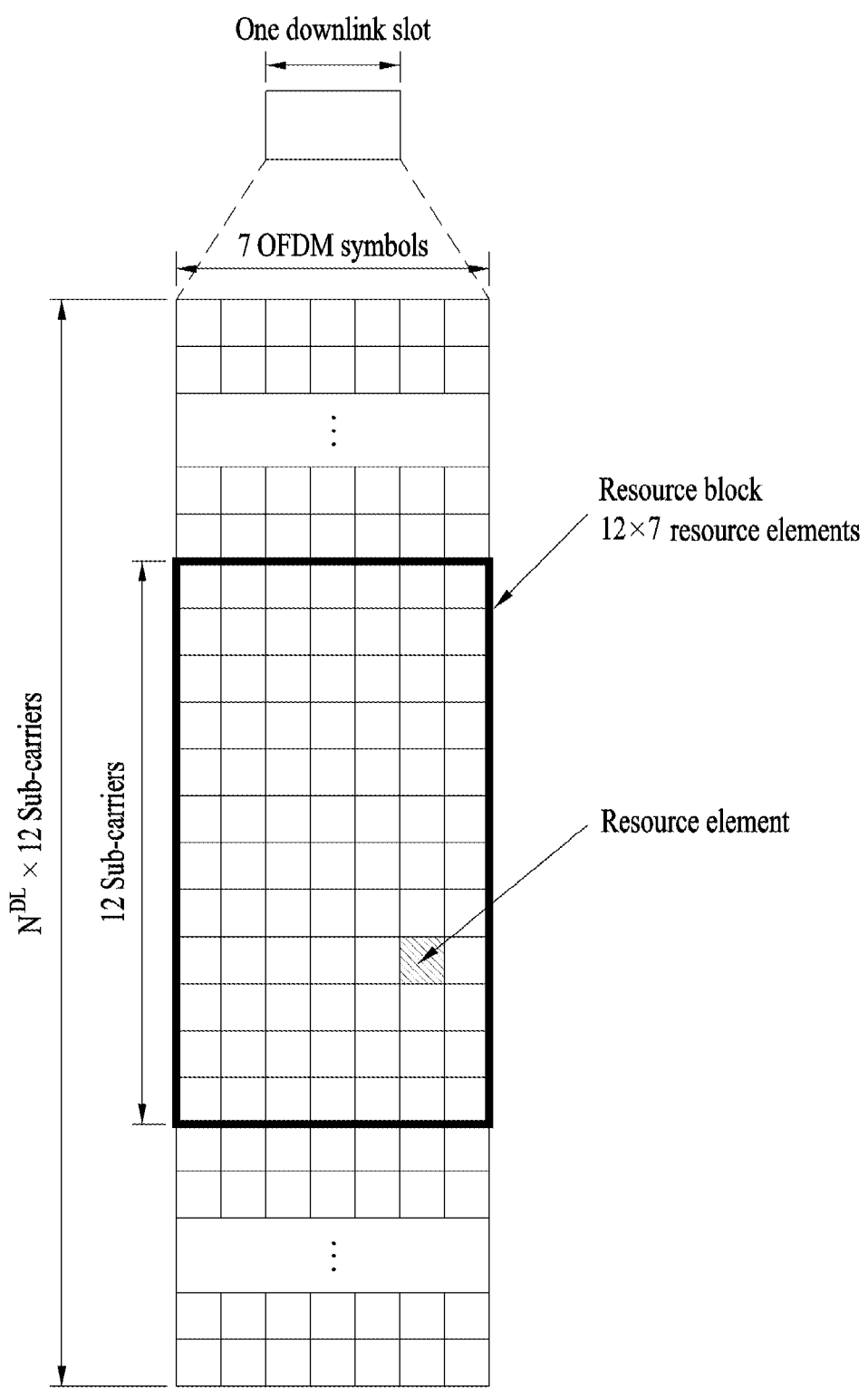
FIG. 2 is a diagram illustrating a resource grid for one downlink (DL) slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
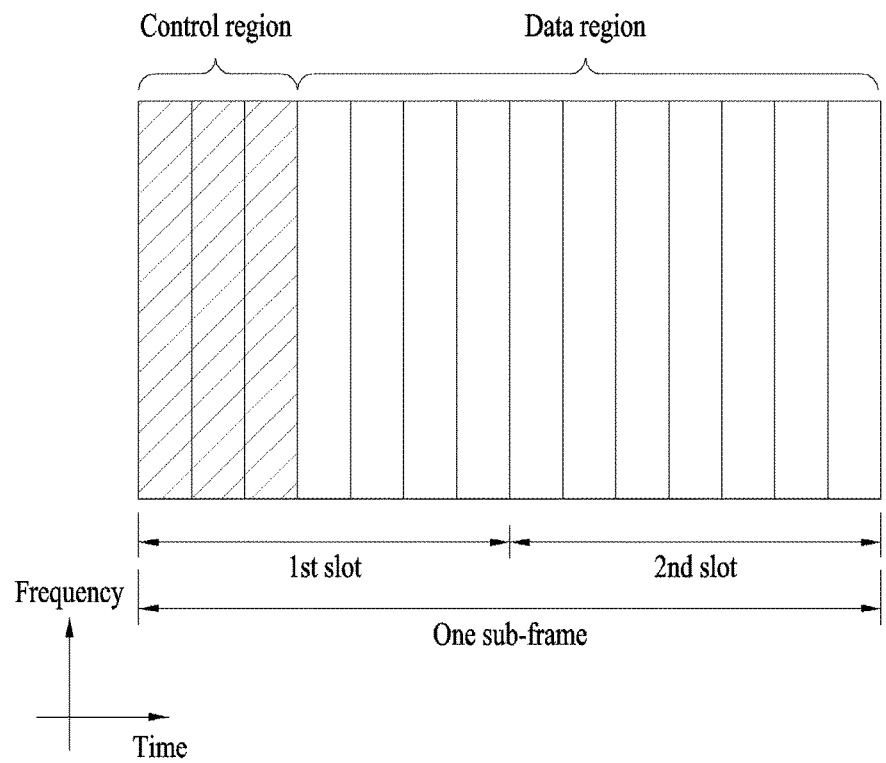
FIG. 3 is a diagram illustrating a DL subframe structure.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
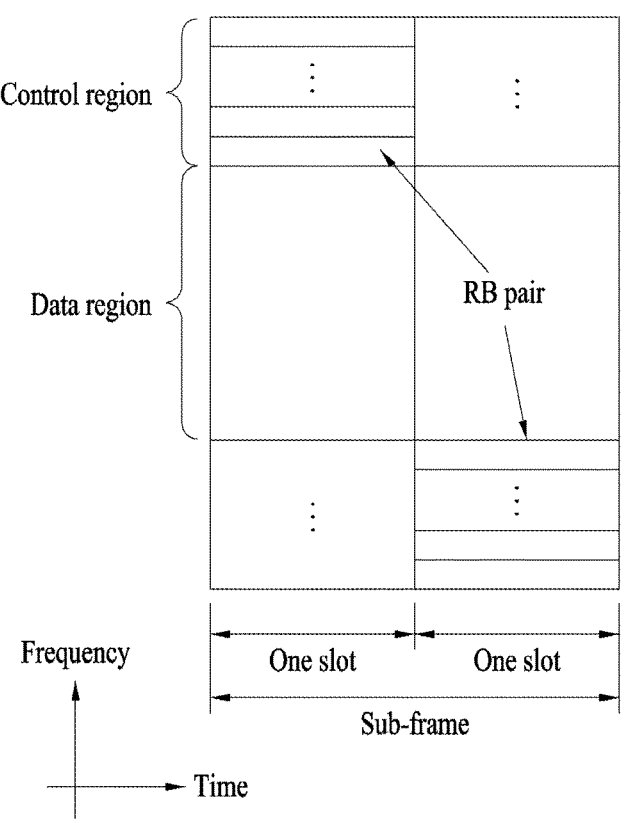
FIG. 4 is a diagram illustrating an uplink (UL) subframe structure.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Demodulation Reference Signal (DMRS)

DMRS is a reference signal defined to allow a UE to perform channel estimation for a PDSCH. The DMRS may be used in transmission modes 7, 8 and 9. The DMRS was initially defined for single layer transmission on antenna port 5. Over time, the definition has expanded to cover spatial multiplexing of up to eight layers. As the term "UE-specific RS", which is another name of the DMRS, suggests, the DMRS is transmitted only for a single specific UE, and accordingly it may be transmitted only on RBs on which a PDSCH for the specific UE is transmitted.

Hereinafter, description will be given of generation of a DMRS for up to eight layers. The DMRS may be transmitted with a reference-signal sequence r(m), which is generated according to Equation 1 given below, mapped to complex-valued modulation symbols $a_{k,l}^{(p)}$, which are generated according to Equation 2 given below. FIG. 6 illustrates antenna ports 7 to 10 with the DMRS mapped to a resource grid in subframes according to Equation 2 in the case of a normal CP.

$$r(m) = \frac{1}{\sqrt{2}}(1 - 2 \cdot c(2m)) + j\frac{1}{\sqrt{2}}(1 - 2 \cdot c(2m+1)),$$

$$m = \begin{cases} 0, 1, \ldots, 12 N_{RB}^{max,DL} - 1 & \text{Normal } CP \\ 0, 1, \ldots, 16 N_{RB}^{max,DL} - 1 & \text{Extended } CP \end{cases}$$

Equation 1

Herein, r(m) denotes a reference-signal sequence, c(i) denotes a pseudo-random sequence, and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m')$$

$$w_p(i) = \begin{cases} \overline{w}_p(i) & (m' + n_{PRB}) \bmod 2 = 0 \\ \overline{w}_p(3 - i) & (m' + n_{PRB}) \bmod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \bmod 2 + 2 & \text{for special subframe configurations 3, 4, 8 and 9} \\ l' \bmod 2 + 2 + 3\lfloor l'/2 \rfloor & \text{for special subframe configurations 1, 2, 6 and 7} \\ l' \bmod 2 + 5 & \text{for subframes other than the special subframes} \end{cases}$$

$$l' = \begin{cases} 0, 1, 2, 3 & n_s \bmod 2 = 0, \text{ and special subframe configurations 1, 2, 6 and 7} \\ 0, 1 & n_s \bmod 2 = 0, \text{ and special subframe configurations 1, 2, 6 and 7} \\ 2, 3 & n_s \bmod 2 = 1, \text{ and configurations other than special subframe} \\ & \text{configurations 1, 2, 6 and 7} \end{cases}$$

$$m' = 0, 1, 2$$

Equation 2

As can be seen from Equation 2, when a reference-signal sequence is mapped to complex demodulation symbols, an orthogonal sequence $\overline{w}_p(i)$ shown in Table 1 below is applied according to antenna ports.

TABLE 1

| Antenna port | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

The DMRSs may perform channel estimation using different methods according to the spreading factor (2 or 4). Referring to Table 1, the spreading factor for antenna ports 7 to 10 is 2 since the orthogonal sequences for the antenna ports are repeated in the pattern of [a b a b]. The spreading factor for antenna ports 11 to 14 is 4. When the spreading factor is 2, a UE may perform channel estimation by despreading the DMRS of the first slot and the DMRS of the second slot respectively using the spreading factor of 2 and then performing time interpolation. When the spreading factor is 4, channel estimation may be performed by despreading the DMRSs in all subframes simultaneously using the spreading factor of 4.

When the spreading factor is 2, channel estimation according to the spreading factor may obtain a gain by applying time interpolation in high mobility situations and a gain in decoding time according to despreading allowed for the DMRS of the first slot. When the spreading factor of 4 is used, more UEs or ranks may be supported.

Figure 7:
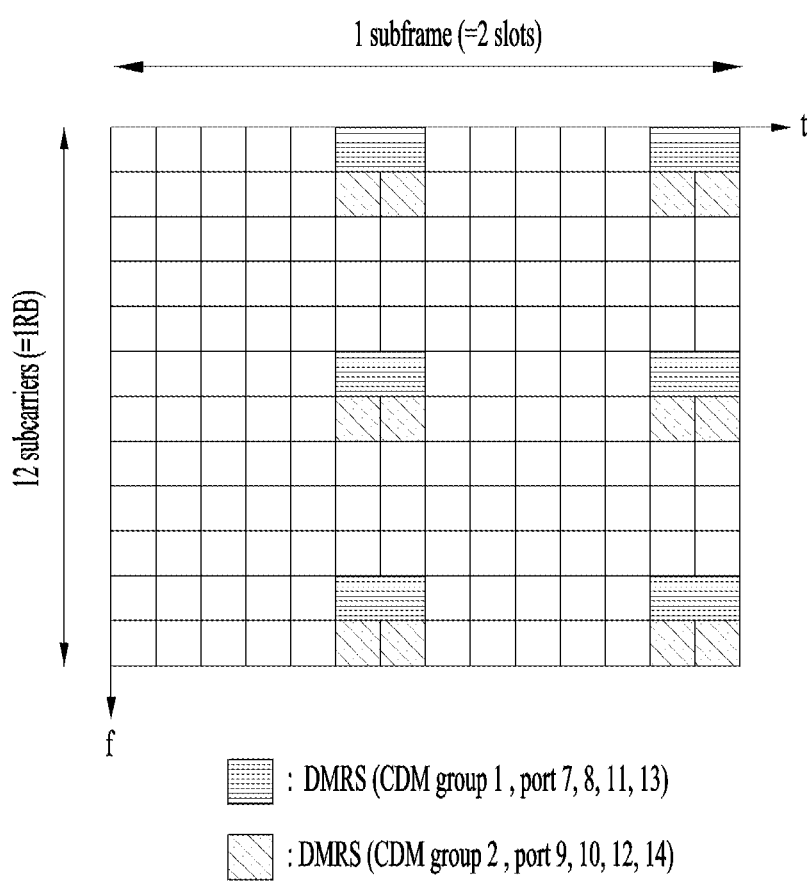
FIG. 7 is a diagram illustrating a code divisional multiplexing (CDM) group.

Hereinafter, description will be given in terms of DMRS overhead with reference to FIG. 7. FIG. 7 illustrates mapping of a DMRS onto a subframe for each of antenna ports 7 to 14. As shown in FIG. 7, antenna ports may be divided into Code Divisional Multiplexing (CDM) group 1 (or a first antenna port set) and CDM group 2 (or a second antenna port set) according to locations in the resource grid to which the DMRSs are mapped. The DMRSs on antenna ports 7, 8, 11 and 13 are transmitted on REs corresponding to CDM group 1, and the DMRSs on antenna ports 9, 10, 12 and 14 are transmitted on REs corresponding to CDM group 2. In other words, the DMRSs on the antenna ports included in one CDM group are transmitted on the same REs. When only antenna ports corresponding to CDM group 1 are used to transmit DMRSs, the number of resources necessary for the DMRSs, namely the DMRS overhead, is 12. Similarly, when antenna ports corresponding to CDM group 2 are used, the DMRS overhead is 24.

Enhanced PDCCH (EPDCCH)

In LTE after Release 11, an enhanced-PDCCH (EPDCCH) which can be transmitted through the existing PDSCH region is considered as a solution to lack of capacity of a PDCCH caused by coordinated multi-point (CoMP), multi user-multiple input multiple output (MU-MIMO), and the like and degradation of PDCCH performance caused by inter-cell interference. In addition, in the case of EPDCCH, channel estimation may be performed based on DMRSs in order to obtain a pre-coding gain, in contrast with the case of the existing CRS-based PDCCH.

EPDCCH transmission may be divided into localized EPDCCH transmission and distributed EPDCCH transmission according to configuration of a physical resource block (PRB) pair used for EPDCCH transmission. Localized EPDCCH transmission represents a case in which resource sets used for transmission of an EPDCCH neighbor each other in the frequency domain, and may adopt precoding to obtain a beamforming gain. For example, localized EPDCCH transmission may be based on consecutive ECCEs the number of which corresponds to an aggregation level. On the other hand, distributed EPDCCH transmission represents transmission of an EPDCCH in PRB pairs separated in the frequency domain, and has a gain in terms of frequency diversity. For example, distributed EPDCCH transmission may be based on an ECCE having four EREGs included in each of PRB pairs separated in the frequency domain. One or two EPDCCH (PRB) sets may be configured for a UE through higher layer signaling, and each EPDCCH PRB set may be intended for one of localized EDPCCH transmission and distributed EPDCCH transmission. When there are two EPDCCH PRB sets, the two sets may partially/fully overlap each other.

An eNB may transmit control information by mapping the control information to REs of EREGs for EPDCCH from one or more EPDCCH PRB sets. Herein, the EREGs are used to define mapping of a control channel to REs, and one PRB pair may include 16 EREGs (EREGs 0 to 15). 4 EREGs (or 8 EREs in some cases) may constitute one ECCE, and x ECCEs (x being one of 1, 2, 4, 8, 16, and 32) may constitute one EPDCCH. In the case of distributed EPDCCH transmission, EREGs present in multiple PRB pairs may constitute one ECCE to ensure diversity. More specifically, in the case of distributed EPDCCH transmission, EREG-to-ECCE mapping (hereinafter, a first ECCE number-EREG number-PRB number relationship) may indicate that 'an ECCE index in an EPDCCH PRB set may correspond to EREG index $$\left\lfloor \frac{n_{ECCE}}{N_P} \right\rfloor + i * N_{CP}$$

in PRB pair index $$\left(n_{ECCE} + i * \max\left(1, \left\lfloor \frac{N_P}{N} \right\rfloor\right)\right) \mod N_P$$

Figure 8:
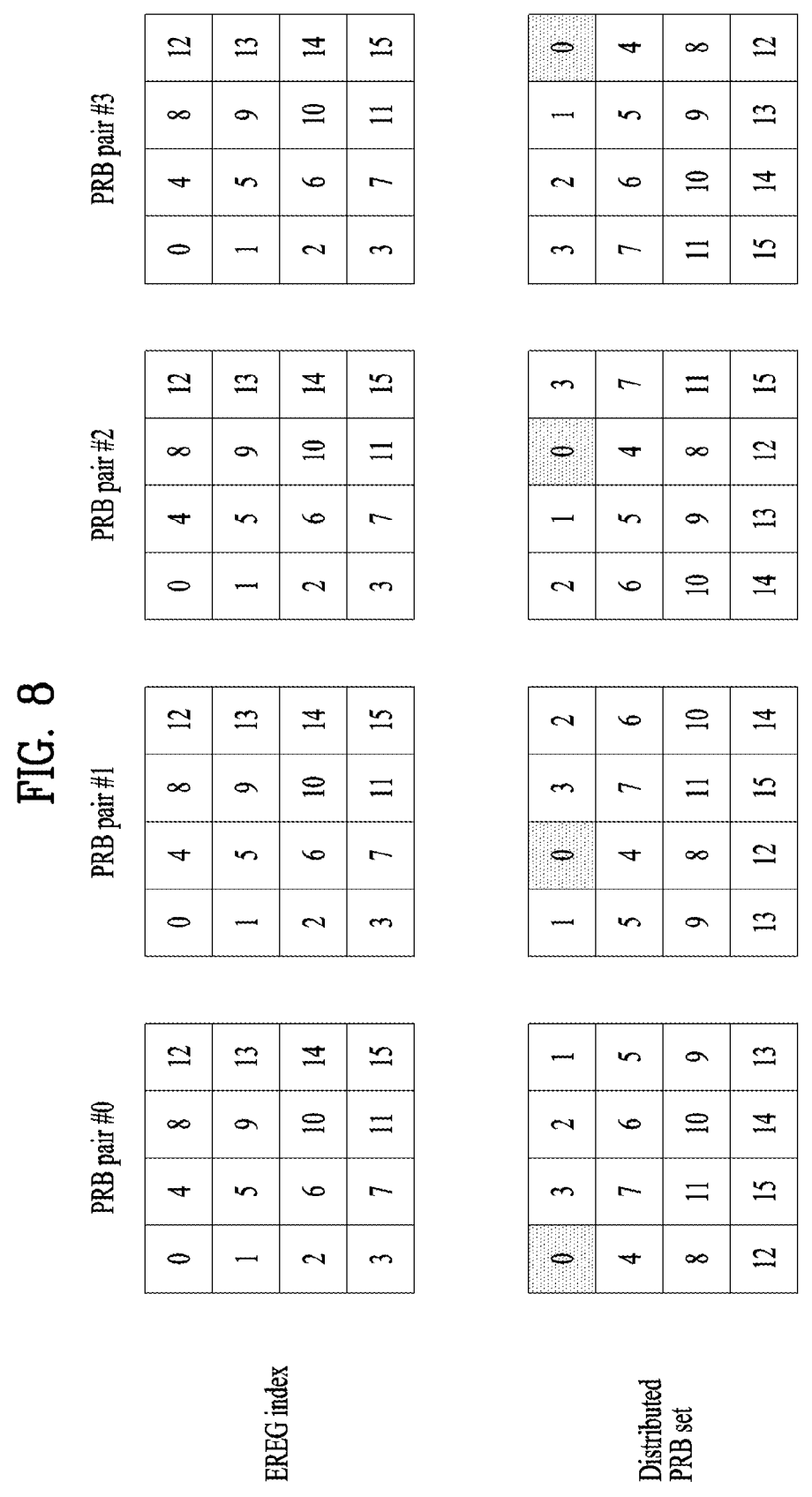

Herein, N denotes the number of EREGs per ECCE, $N_{CP}$ denotes the number of ECCEs per PRB pair, $N_{P,set1}$ denotes the number of PRB pairs of a first EPDCCH PRB set, $N_{P,set2}$ denotes the number of PRB pairs of a second EPDCCH PRB set, and i=0, 1, . . . , N−1. For example, according to the first ECCE number-EREG number-PRB number relationship, when 4 PRB pairs are included in an EPDCCH PRB set, ECCE index 0 includes EREG 0 of PRB pair 0, EREG 4 of PRB pair 1, EREG 8 of PRB pair 2, and EREG 12 of PRB pair 4. The EREG-to-ECCE mapping relationship is illustrated in FIG. 8.

The UE may perform blind decoding as in a legacy LTE/LTE-A system to receive/acquire DCI over an EPDCCH. More specifically, the UE may attempt to decode (or monitor) a set of EPDCCH candidates at each aggregation level, for DCI formats corresponding to set transmission modes. Herein, the set of EPDCCH candidates subjected to monitoring may be referred to as an EPDCCH UE-specific search space, and the search space may be set/configured for each aggregation level. In addition, the aggregation levels may be {1, 2, 4, 8, 16, 32} according to the type of a subframe, the length of a CP, and the amount of available resources in a PRB pair, which is more or less different from the case of a legacy LTE/LTE-A system.

For a UE for which an EPDCCH is configured, REs included in PRB pairs may be indexed by EREGs, and the EREGs may in turn be indexed in units of ECCEs. EPDCCH candidates configuring a search space may be determined based on the indexed ECCEs and then blind decoding may be performed. Thereby, control information may be received.

The UE having received an EPDCCH may transmit ACK/NACK for the EPDCCH over the PUCCH. The index of a resource, i.e., a PUCCH resource may be determined by the lowest ECCE index among the ECCE indexes used for transmission of the EPDCCH. That is, the index may be expressed as Equation 3 given below.

$$n_{PUCCH-ECCE}^{(l)} = n_{ECCE} + N_{PUCCH}^{(l)}$$ Equation 3

In Equation 3, $n_{PUCCH-ECCE}^{(l)}$ is the index of the PUCCH resource, $n_{ECCE}$ is the lowest ECCE index among the ECCE indexes used in transmitting the EPDCCH, and $N_{PUCCH}^{(l)}$ (which may be replaced by $N_{PUCCH,EPDCCH}^{(l)}$), which is a value delivered through higher layer signaling, represents the point where the PUCCH resource index starts.

In the case in which a PUCCH resource index is determined solely by Equation 2, resource collision may occur. For example, if two EPDCCH PRB sets are configured, ECCE indexing is independently conducted in each EPDCCH PRB set, and thus the lowest ECCE indexes of the EPDCCH PRB sets may be equal. This problem may be addressed by setting different start points of the PUCCH resources for different users. However, setting the start point of the PUCCH resource differently for every user results in reservation of many PUCCH resources and is thus inefficient. In addition, DCI of multiple users may be transmitted over the EPDCCH at the same ECCE location as in the case of MU-MIMO, and therefore there is also a need for a method for allocation of PUCCH resources considering the aforementioned case. To address the problem as described above, HARQ-ACK Resource Offset (ARO) has been introduced. ARO allows avoidance of PUCCH resource collision by shifting the PUCCH resources, which are determined by the lowest ECCE index of the ECCE indexes configuring an EPDCCH and the start offsets of the PUCCH resources conveyed through higher layer signaling, to a predetermined extent. ARO is indicated by 2 bits in DCI formats 1A/1B/1D/1/2A/2/2B/2C/2D transmitted over the EPDCCH, as shown below in Table 2.

TABLE 2

| ACK/NACK Resource offset field in DCI format 1A/1B/1D/1/2A/2/2B/2C/2D | $\Delta_{ARO}$ |
|---|---|
| 0 | 0 |
| 1 | −1 |
| 2 | −2 |
| 3 | 2 |

An eNB designates one of the ARO values in Table 2 for a specific UE, and then announces, to the specific UE, an ARO to use in determining a PUCCH resource, through a DCI format. The UE may detect an ARO field in the DCI format thereof and transmit a reception acknowledgement through a PUCCH resource determined using the detected field value.

DMRS Pattern

A DMRS pattern according to an embodiment described below is basically intended to reduce DMRS overhead to secure available resources for PDSCH or EPDCCH. Reducing the DMRS overhead may lower the accuracy of channel estimation. To make up for lowered accuracy, PRB bundling, which will be described below, may be used. In addition, the number of layers may be restricted in a subframe in which the DMRS pattern is used, in order to reduce inter-layer interference. In implementing the DMRS pattern described below, inter-cell RS collision may also be considered.

Figure 9:
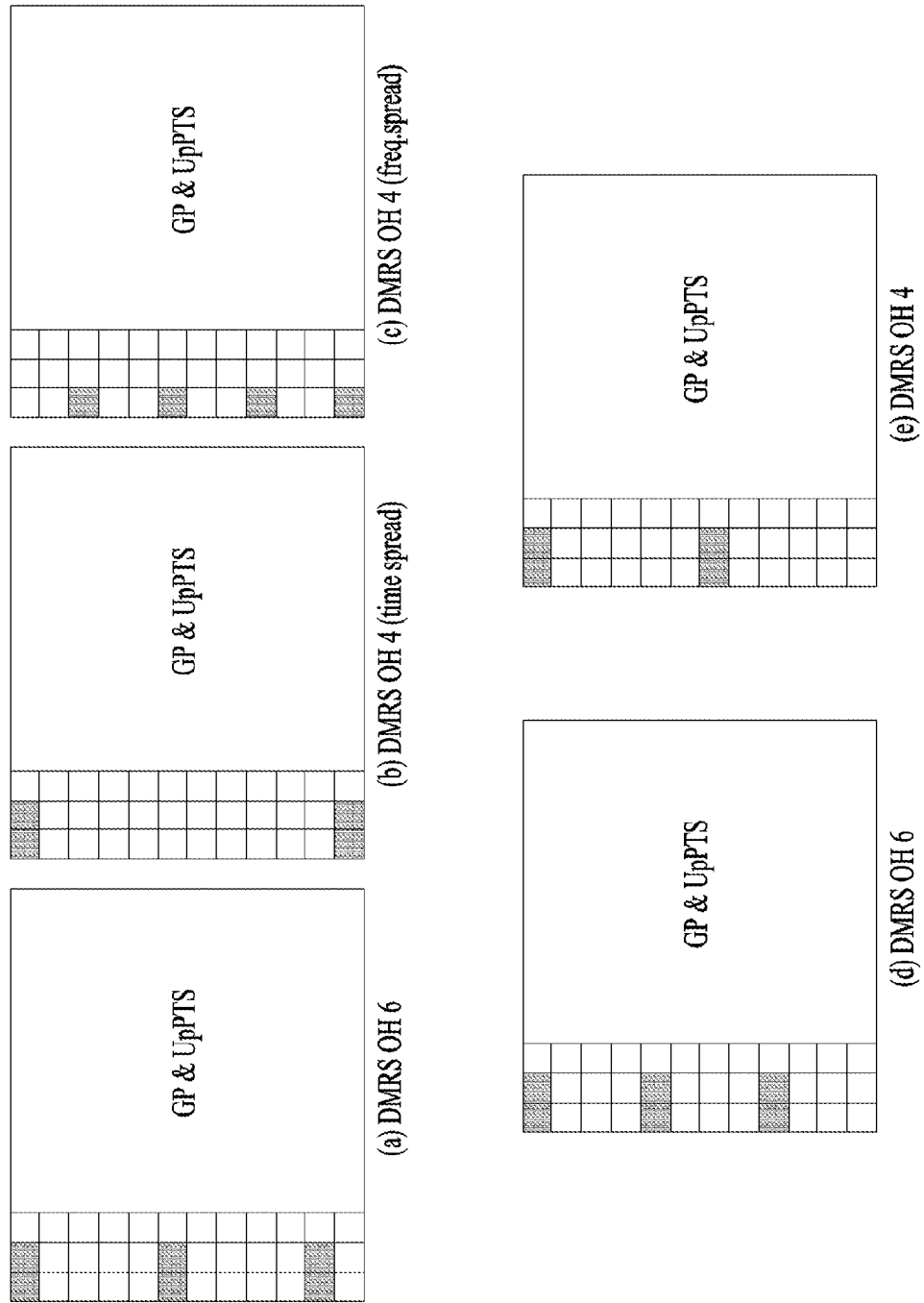
FIGS. 9 and 10 illustrate exemplary DMRS patterns according to embodiments of the present disclosure.
Figure 10:
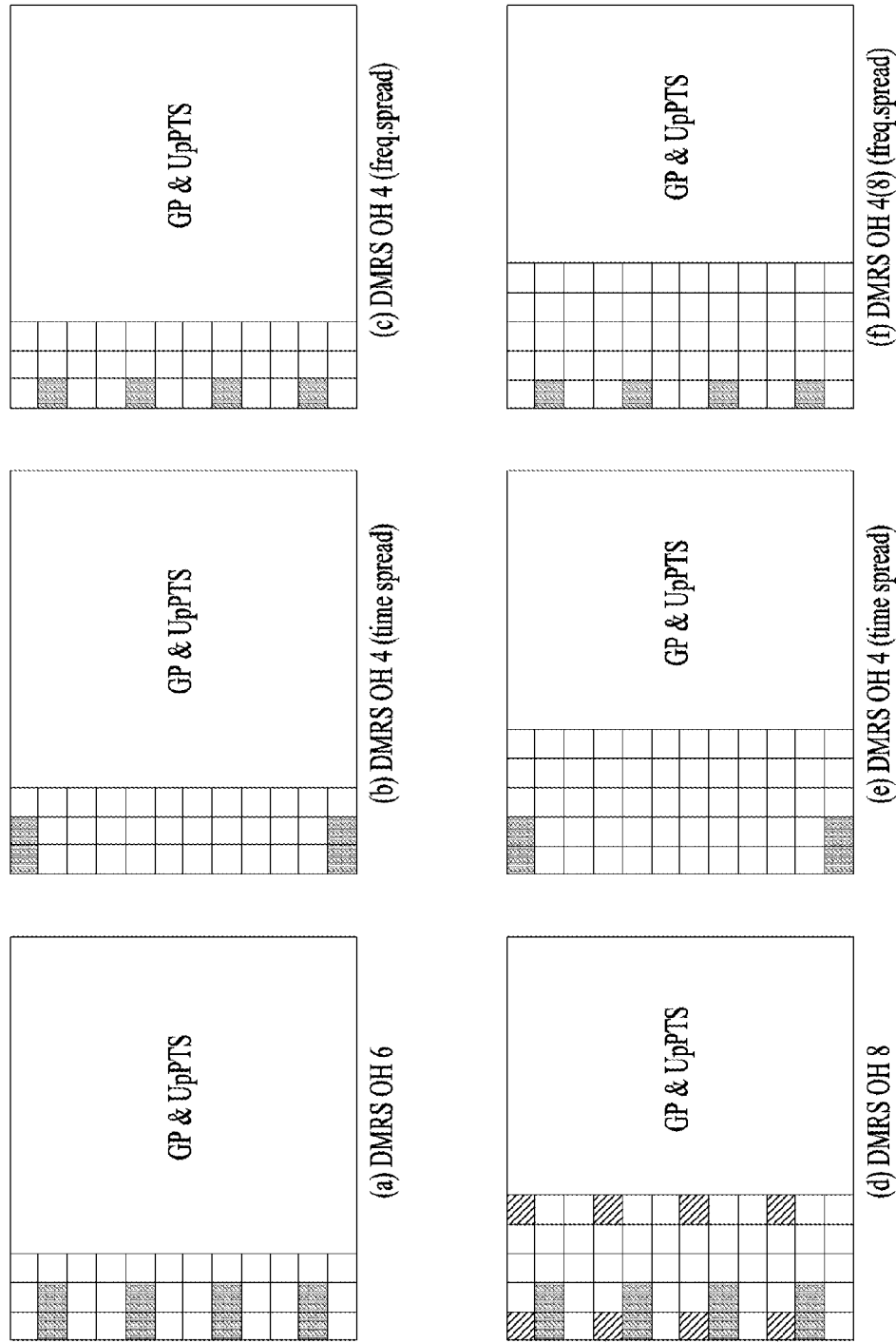

FIGS. 9 and 10 illustrate an exemplary DMRS pattern according to an embodiment of the present disclosure. FIGS. 9(a) to 9(e) show PRB pairs, in which shaded squares represent REs to which the DMRS is mapped. In FIG. 9, 'DMRS OH' means DMRS overhead.

FIG. 9(a) shows a DMRS pattern for which only a specific CDM group (e.g., CDM group 0) is allowed to be used. In this case, available antenna ports are restricted to antenna ports 7 and 8, and cell-specific CDM group selection may be employed as a method for avoiding RS collision. For example, in association with a cell ID (or a cell specific parameter), it may be determined whether to use a CDM group 0-based pattern (ports 7 and 8) or CDM group 1-based pattern (ports 9 and 10). Alternatively, cell-specific port selection (e.g., port 7 or 8) may be used with a CDM group kept constant. Resources of a CDM group which are unused in each cell may be used in performing data transmission. In FIG. 9(b), the DRMS RE is located at the end of a PRB pair, which may improve performance of channel estimation performed in an interpolation manner. In this pattern, the number of layers allowed to perform transmission simultaneously may be limited to 2. The employed ports, which may be one of {7,8} and {9,10}, may be predetermined, signaled, or determined based on a cell ID (e.g., an employed port group may be determined based on a modulo operation on a cell ID). In FIG. 9(c), 4 REs are used for DMRS transmission. As can be seen from the figure, the 4 REs are spread in the frequency domain. This may mean that a DMRS spreading sequence is applied in the frequency domain. In this case, up to four layers may be used, and inter-cell RS collision may be avoided using a v-shift (e.g., a v-shift based on a cell ID). An h-shift may also be applied. That is, an OFDM symbol (and/or v-shift value) to which the DMRS is mapped may be determined in association with a cell specific parameter. FIGS. 9(d) and 9(e) show DMRS patterns in which the REs are equally spaced in a subframe in the frequency domain and also equally spaced in a plurality of PRB pairs. This feature enables v-shift in contrast with the legacy DMRS, and is useful for PRB bundling, which will be described later.

While FIG. 9 illustrates DMRS REs as being located on the first and second OFDM symbols, the pattern may be mapped the second and third OFDM symbols due to partial transmission of CRS (e.g., tracking RS (TRS)). If the TRS or the like is transmitted with a constant periodicity (and/or in a specific frequency domain), the DMRS pattern considering the TRS may be used only in the corresponding subframe or a specific frequency domain of the corresponding subframe. This means that a resource-specific DMRS pattern can be used. In other words, different (or h-shift-applied) DMRS patterns may be used for respective frequency domains according to presence or absence of a specific signal in the same subframe.

FIG. 10 shows another DMRS pattern (particularly, a DMRS pattern applicable in the case of an extended CP). FIGS. 10(a), 10(b) and 10(c) relate to special subframes 0 and 4 of an extended CP, and FIGS. 10(d), 10(e) and 10(f) illustrate DMRS patterns employed when the DwPTS interval corresponds to 5 OFDM symbols. In FIG. 10(d), a DMRS pattern corresponding to special subframe configurations 1, 2, 3, 4 and 5 is shifted to the first and second OFDM symbols, and the hatched portions indicate a pattern for obtaining a gain through interpolation. In the hatched portions, DMRS is positioned on both end symbols of a DwPTS with the time domain spreading maintained. If special subframe configuration 7 is applied and the DMRS pattern of FIG. 10(d) is used in the extended CP, 8 EREGs may be defined to constitute one ECCE (namely, only two ECCEs may be present per PRB pair in special subframes 1, 2, 3, 5, 6 and 7 of the extended CP). Alternatively, similar configuration may be established if one PRB pair consists of one ECCE in the extended CP in special subframe configuration 7 according to whether another signal is inserted (i.e., a resource to which EPDCCH cannot be mapped is added). For example, if there are 2 ECCE/PRB pairs, and a specific condition (e.g., the number of available REs) is satisfied, an EPDCCH configuration of 1 ECCE/PRB pair may be applied. On the other hand, in the cases of FIGS. 10(a) to 10(c), namely for special subframe configurations 0 and 4 of the extended CP, one PRB pair may consist of one ECCE. That is, an ECCE may be defined as being constituted by 16 EREGs, and in this case, an antenna port used for each PRB pair may be a cell specific (or UE-specific) or subframe-specific (or PRB pair-specific) antenna port.

In the aforementioned DMRS pattern, if multiple antenna ports are mapped to the same resource, cell-specific port selection (for avoiding RS collision) or UE-specific port selection (for utilization efficiency) may be employed. In determining an antenna port for each case, antenna port may be designated (or antenna port selection may be determined) through higher layer signaling, and an antenna port to be used on a specific resource may be determined by a cell ID (or a corresponding cell-specific parameter) or a UE ID (or a corresponding UE-specific parameter). For example, in the case of FIG. 9(c), if one PRB is used for transmission of one ECCE due to lack of resources, as many UEs as the number of RBs corresponding to the maximum system bandwidth may receive transmitted EPDCCH in a corresponding subframe. Accordingly, a different antenna port may be used for each UE (on a corresponding PRB pair) through modulo operation of the UE ID. This method may be similar to a method of selecting a representative antenna port in a high aggregation level. However, in the case of FIG. 9(c), when 16 EREGs constitutes one ECCE, EPDCCH MU-MIMO is supported in aggregation level 1 and a candidate antenna port of aggregation level 1 (for the same resource) may differ among UEs.

PRB Bundling

As described above, using DMRS having reduced overhead may degrade channel estimation performance. To make up for the performance degradation, PRB bundling may be used. For distributed EPDCCH, PRB bundling may be performed on all EPDCCH candidates in an EPDCCH PRB set. In this case, the eNB may apply the same precoding to all PRB pairs (or units related to EPDCCH transmission) in the EPDCCH PRB set. For example, in the whole distributed EPDCCH PRB set, precoding matrix (index) A may be applied to port 107, and precoding matrix (index) B may be applied to port 109. If different precoding operations are applied to PRB pairs in the EPDCCH PRB set, PRB bundling cannot be performed, and this information may be signaled. PRB bundling may be operated by a 'PRB bundled subframe'. The 'PRB bundled subframe' may be restrictively applied to both PDSCH and EPDCCH or only to EPDCCH. In the 'PRB bundled subframe', the UE may receive a signal (EPDCCH, PDSCH, etc.) through two or more PRB pairs. When the two or more PRB pairs are within a certain range (e.g., the maximum PRB bundling size) in the frequency domain, all RSs (or antenna ports) of the PRB pairs may be used to perform channel estimation.

Regarding PRB bundling, an eNB may signal i) whether or not PRB bundling is performed, ii) a range of PRB bundling. More specifically, the eNB may signal whether or not PRB bundling can be performed for each subframe set (or resource set, EPDCCH PRB set, PRB pair) and/or each UE. Whether or not PRB bundling is allowed in a subframe may be indicated or a subframe set in which PRB bundling can be performed may be indicated, through physical layer or higher layer signaling. PRB bundling may be performed between PRB pairs which are not consecutive or regardless of the PRG size, and the eNB may signal, to the UE, the range in which PRB bundling can be performed, the maximum PRB bundling size, and the like. This may be interpreted as meaning that the eNB applies the same precoding to corresponding resources when DCI transmitted to a UE is divided into multiple PRB pairs, and the PRB pairs are within a PRB bundling size signaled by the eNB (or a predefined PRB bundling size). This feature may be particularly useful for PRB bundling of EPDCCH. That is, regarding EPDCCH, the eNB may signal, to a UE, multiple EPDCCH PRB sets including PRB pairs on which EPDCCH can be transmitted, and positions of PRB pairs constituting each EPDCCH PRB set may be arbitrarily determined. Accordingly, when a localized EPDCCH is transmitted at a high aggregation level, or a distributed EPDCCH is transmitted, the UE may perform PRB bundling for decoding of a corresponding candidate if an EPDCCH resource unit (e.g., EREG, ECCE) used in transmitting one DCI is within the range signaled from the eNB (or predefined range) even when the resource unit belongs to different PRB pairs.

Figure 11:
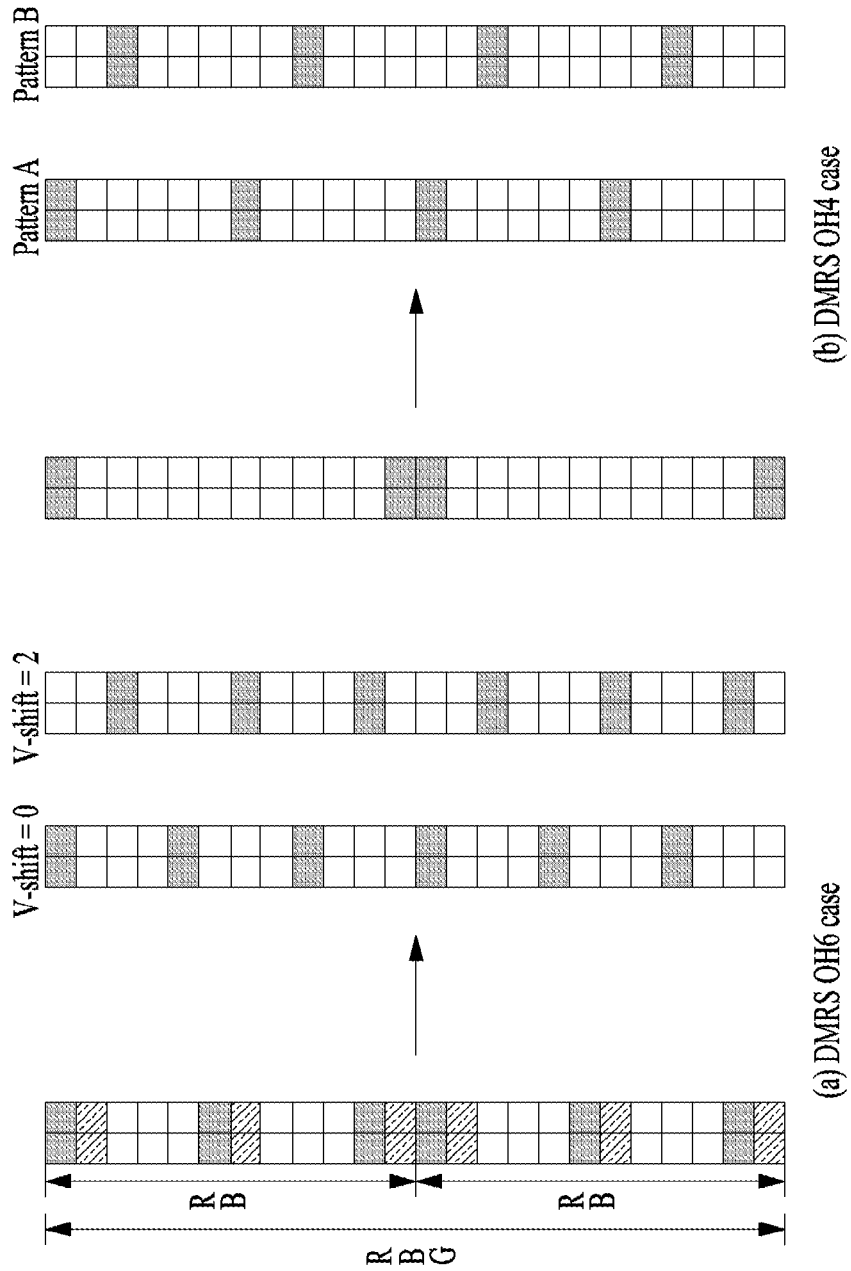
FIG. 11 illustrates PRB bundling according to an embodiment of the present disclosure.

FIG. 11 illustrates a DMRS pattern used when PRB bundling is performed. In FIGS. 11(a) and 11(b), a pattern shown on the left is a legacy DMRS pattern, and the two patterns shown on the right side are DMRS patterns related to PRB bundling. V-shift may be applied to each DMRS pattern, and DMRS is assumed to be transmitted on the first and second OFDM symbols. However, embodiments of the present disclosure are not limited thereto. DMRS may be transmitted on the second and third symbols.

EPDCCH Configuration

In a subframe lacking resources for transmission of PDSCH, EPDCCH, and the like as described above, an EPDCCH may be configured as described below. In the description given below, a new carrier type (NCT) will be introduced, which may be applied even when the number of available REs is changed.

Figure 12:
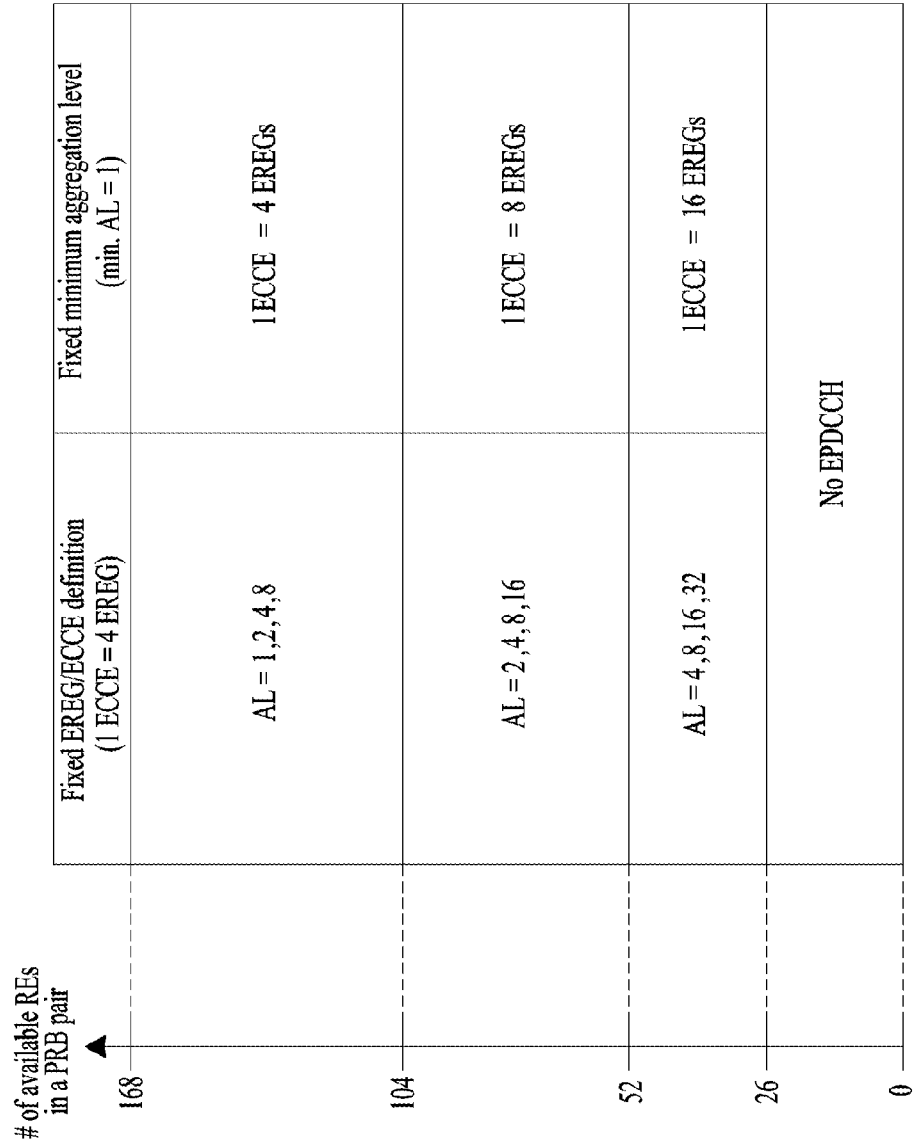
FIG. 12 is a diagram illustrating an EPDCCH configuration according to an embodiment of the present disclosure.

FIG. 12 is a diagram illustrating an EPDCCH configuration according to an embodiment of the present disclosure. Referring to FIG. 12, the lowest aggregation level or the number of EREGs per ECCE that is applied to EPDCCH may be determined depending on a range covering the number of REs usable for EPDCCH in a PRB pair among a plurality of preset ranges. For example, if the number of EREGs per ECCE is invariable (1 ECCE=4 EREGs as illustrated in the figure), and the number of available REs is in the second lowest range, the lowest aggregation level may be determined to be 4. If the number of available REs is in the next lowest range, the lowest aggregation level may be determined to be 2. That is, the lowest aggregation level may be inversely proportional to the number of available REs. This is intended to adapt the lowest aggregation level to the coding rate by increasing the lowest aggregation level when available REs are in sufficient. If the lowest aggregation level is invariably set (e.g., to 1 as shown in the figure), the number of EREGs per ECCE may be inversely proportional to the number of available REs. In summary, if the number of EREGs constituting one ECCE is invariably set, the lowest aggregation level is increased to secure a coding rate. If the lowest aggregation level is invariably set, the number of EREGs constituting one ECCE is increased to secure a coding rate. The aforementioned ranges may be distinguished by an integer multiple of the number of REs according to the lowest coding rate for transmitting DCI.

Referring to FIG. 12, if the number of REs usable for EPDCCH in a PRB pair is less than 26, a required coding rate for transmission of a piece of DCI cannot be met even if the entirety of one PRB pair is used, and thus it may be assumed that EPDCCH transmission is not performed in the PRB pair. Alternatively, an aggregation level higher than aggregation level 8 may be allowed.

The EPDCCH configuration described above may be used only in a specific subframe/PRB pair. For example, when the transmission period of a special subframe is different from that of other signals (CRS, TRS, CSI-RS, IMR, etc.), the aforementioned EPDCCH configuration may be applied only to the special subframe in which none of the other signals are transmitted. For a signal transmitting only in 6 RBs in the middle of a bandwidth, the PRB pair corresponding to the 6 RBs may be excluded from the process of candidate configuration, or a candidate including resources in the PRB pair may be excluded from blind decoding.

Meanwhile, EPDCCH configuration may be determined according to a subframe type as shown in Table 3.

TABLE 3

| Legacy Carrier Type (LCT) | | | | New Carrier Type (NCT) | | | |
|---|---|---|---|---|---|---|---|
| Normal subframe | Special subframe configuration | | | Normal subframe | Special subframe configuration | | |
| | 3, 4, 8 | 1, 2, 6, 7 | 0, 5, 9 | | 3, 4, 8 | 1, 2, 6, 7 | 0, 5, 9 |
| 4 | 4 | 8 | No EPDCCH | 4 | 4 | 4 | 8(16) |

The number of EREGs per ECCE may be determined according to Table 3, and the lowest aggregation level in each subframe may be determined according to the number of available REs of each subframe (or PRB pair). For example, for special subframe configurations 0, 5 and 9 of NCT in the table above, the number of EREGs per ECCE may be set to 8. If the number of available REs is less than 26, the lowest aggregation level may be defined as 2. An EPDCCH configuration for a subframe in which PMCH needs to be decoded may be separately defined. For example, the subframe in which PMCH needs to be decoded may be defined as using EPDCCH configurations such as special subframe configurations 0, 5 and 9 of NCT regardless of the type of the subframe Configuration of Apparatuses According to One Embodiment of the Present Invention FIG. 13 is a diagram illustrating configurations of a transmit point and a UE according to one embodiment of the present invention.

Figure 13:
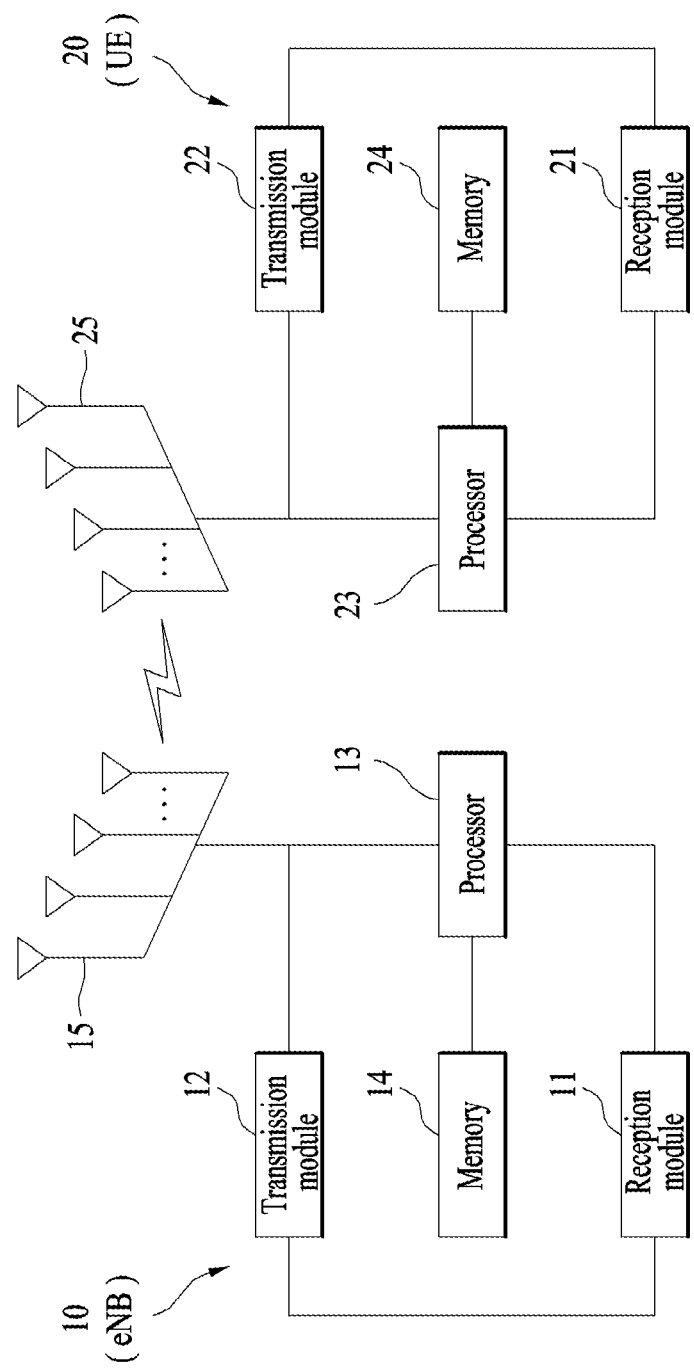
FIG. 13 is a diagram illustrating configuration of transceivers.

Referring to FIG. 13, a transmit point 1010 may include a reception module 1011, a transmission module 1012, a processor 1013, a memory 1014, and a plurality of antennas 1015. The antennas 1015 represent the transmit point that supports MIMO transmission and reception. The reception module 1011 may receive various signals, data and information from a UE on uplink. The transmission module 1012 may transmit various signals, data and information to a UE on downlink. The processor 1013 may control overall operation of the transmit point 1010.

The processor 1013 of the transmit point 1010 according to one embodiment of the present invention may perform processing operations necessary for the embodiments described above.

Additionally, the processor 1013 of the transmit point 1010 may function to computationally process information received by the transmit point 1010 or information to be transmitted to the outside, etc. The memory 1014, which may be replaced with an element such as a buffer (not shown), may store the computationally processed information for a predetermined time.

Referring to FIG. 13, a UE 1020 may include a reception module 1021, a transmission module 1022, a processor 1023, a memory 1024, and a plurality of antennas 1025. The antennas 1025 mean that the UE supports MIMO transmission and reception. The reception module 1021 may receive various signals, data and information from an eNB on downlink. The transmission module 1022 may transmit various signals, data and information to the eNB on uplink. The processor 1023 may control overall operation of the UE 1020.

The processor 1023 of the UE 1020 according to one embodiment of the present invention may perform processing operations necessary for the embodiments described above.

Additionally, the processor 1023 may function to computationally process information received by the UE 1020 or information to be transmitted to the outside, and the memory 1024, which may be replaced with an element such as a buffer (not shown), may store the computationally processed information for a predetermined time.

The configurations of the transmit point and the UE as described above may be implemented such that the above-described embodiments are independently applied or two or more thereof are simultaneously applied, and description of redundant parts is omitted for clarity.

Description of the transmit point 1010 in FIG. 13 may also be applied to a relay which serves as a downlink transmitter or an uplink receiver, and description of the UE 1020 may be equally applied to a relay which serves as a downlink receiver or an uplink transmitter.

The embodiments of the present invention may be implemented through various means, for example, hardware, firmware, software, or a combination thereof.

When implemented by hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented by firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for receiving control information over an enhanced physical downlink control channel (EPDCCH) by a terminal in a wireless communication system, the method comprising:
   receiving a demodulation reference signal (DMRS) included in a physical resource block (PRB) pair; and
   monitoring the EPDCCH associated with the DMRS,
   wherein the terminal applies a lowest aggregation level or a number of enhanced resource element groups (EREGs) per enhanced control channel element (ECCE) to the EPDCCH as determined according to a range covering a number of resource elements (REs) included in the PRB pair among a plurality of preset ranges, and
   wherein the range is distinguished by an integer multiple of the number of REs according to a lowest coding rate for transmitting one downlink control information item.

2. The method according to claim 1, wherein the lowest aggregation level applied to the EPDCCH is inversely proportional to the number of REs included in the PRB pair.

3. The method according to claim 2, wherein the number of EREGs per ECCE is constant regardless of the range.

4. The method according to claim 1, wherein the number of EREGs per ECCE is inversely proportional to the number of REs included in the PRB pair.

5. The method according to claim 4, wherein the lowest aggregation level applied to the EPDCCH is constant regardless of the range.

6. The method according to claim 1, wherein the number of REs mapped to the DMRS are equally spaced in a frequency domain.

7. The method according to claim 6, wherein the DMRS is shifted along a frequency axis according to a cell identifier (ID).

8. The method according to claim 6, wherein the REs mapped to the DMRS are present on first and second orthogonal frequency division multiplexing (OFDM) symbols.

9. The method according to claim 1, wherein, when the number of available REs is less than or equal to a preset value, all DMRSs included in another PRB pair bundled with the PRB pair are used in performing the monitoring.

10. The method according to claim 1, wherein an EREG indexing is applied to only 144 REs in the PRB pair regardless of the DMRS overhead.

11. The method according to 10, wherein the EREG indexing is performed except for REs used for the DMRS.

12. A terminal for receiving a downlink signal over an enhanced physical downlink control channel (EPDCCH) in a wireless communication system, the terminal comprising:
   a reception module; and
   a processor,
   wherein the processor is configured to:
   control the reception module to receive a demodulation reference signal (DMRS) included in a physical resource block (PRB) pair,
   monitor the EPDCCH associated with the DMRS, and
   apply a lowest aggregation level or number of enhanced resource element groups (EREGs) per enhanced control channel element (ECCE) to the EPDCCH as determined according to a range covering a number of resource elements (REs) included in the PRB pair among a plurality of preset ranges, wherein the range is distinguished by an integer multiple of the number of REs according to a lowest coding rate for transmitting one downlink control information item.

* * * * *